United States Patent Office 3,201,970
Patented Aug. 24, 1965

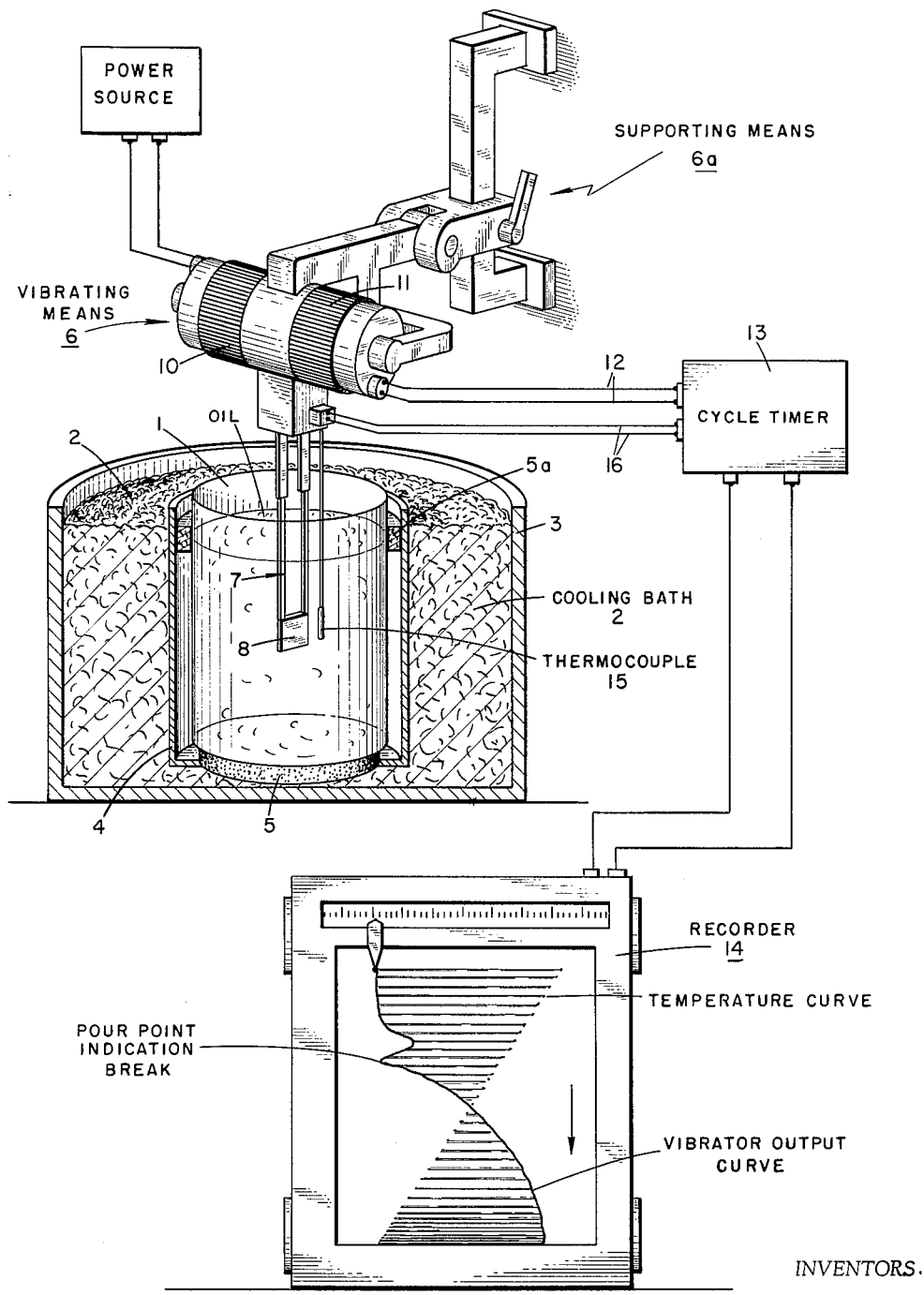

3,201,970
POUR POINT DETERMINATION
John B. Beaugh and Richard C. Halter, Baytown, Tex., assignors, by mesne assignments, to Esso Research and Engineering Company, Elizabeth, N.J., a corporation of Delaware
Filed Dec. 26, 1961, Ser. No. 161,856
7 Claims. (Cl. 73—17)

The present invention is directed to a method and apparatus for measuring the pour point of lubricating oil. More particularly, the invention is concerned with the measuring of pour point with a vibrating probe immersible into the oil. In its most specific aspect, the invention is directed to the method and apparatus for obtaining the pour point of lubricating oils by measuring the change in potential generated in response to the vibrational energy of a vibrating probe immersed in the oil while the oil is cooled from a temperature above the pour point to a temperature below the pour point.

The standard method presently used for testing pour point is set forth in the ASTM Standards of 1958 as designation D97–57. This standardized test requires laboratory techniques for measuring pour point. The procedure in summary, involves pouring the oil into a standard test jar. The oil is heated to a temperature of 115° F. so that the history of the sample is known, i.e., to obtain a uniform fluid and to eliminate the possibility of any crystalline structures in the oil, and then the oil is cooled to 90° F. The test jar is then inserted into a standardized apparatus for measuring cloud and pour points. The apparatus comprises a cooling bath maintained at 30° F. to 35° F. Beginning at a temperature 20° F. above the expected pour point, at each 5° F. increment the test jar is removed from the cooling bath and tilted just enough to ascertain whether there is movement of the oil in the test jar. This is repeated, and if the oil has not ceased to flow when its temperature has reached 50° F., the test jar is inserted into a second cooling bath maintained at a temperature of 0° to plus 5° F. Again, in the 5° increments, the test jar is removed and tilted to determine if there is movement of the oil in the test jar. As soon as the oil in the test jar does not flow when the jar is tilted, the test jar is held in a horizontal position for exactly 5 seconds as determined by an accurate timing device. If the oil shows any movement under these conditions, the test jar is replaced into the cloud and pour point apparatus and the test is repeated for flow at the next lower 5° F. temperature. The pour point as determined by this test is recorded as the temperature 5° F. above the temperature wherein the oil appears solid.

It can be appreciated from the foregoing that the standard pour point test now used is time consuming and cumbersome for use in any place other than a laboratory. Further, because of all the controlled temperatures, apparatus and other incidentals, which are part of the test, the procedure has no flexibility, and requires persons trained in running the test. It is one object of the present invention to overcome many of the deficiencies of the standardized ASTM D97–57 procedure for measuring pour point.

The present invention briefly involves the use of a vibrating probe introduced into a lubricating oil for measuring its pour point. It has been found that when the oil is cooled from a temperature above its pour point to a temperature below the pour point, surprisingly the damping action of the oil causes a definite change in the vibrational energy of the vibrating probe at the pour point temperature of the oil.

According to the present invention it is necessary to employ a means to vibrate the probe introduced into the oil and to provide a means to record the change in the vibration of the probe caused by the damping action of the oil as the properties of the oil change due to cooling. The vibration of the probe is such as to cause the oil to be pushed away from the probe. The resulting definite reduction in the damping action of the oil at the pour point may be the result of the lack of flow of oil after being pushed away from the probe, and hence, a more accurate and reproducible pour point may be obtained than by the standardized test now used.

The present invention will be further illustrated by reference to the drawing in which the single figure is a diagram of a preferred embodiment.

The apparatus, which is schematically shown in the drawing for carrying out the method of measuring the pour point consists of a container means, such as a cup 1 for holding the oil while measuring its pour point. The cup 1 is inserted into a cooling bath 2, which consists of an outer container 3 having an appropriate cooling mixture therein, for example, Dry Ice and isopropanol and a metal container 4 with a cork disk 5 in the bottom thereof and a cork ring 5a at the top. The metal container 4 and cork 5 and 5a provide an air space between the oil cup 1 and the cooling mixture so that the rate of cooling may be controlled to give reproducible results in the pour point determination. The cork 5a also serves to hold the cup 1 in place. A vibrating means 6, which comprises a probe 7 having a paddle 8 at the end thereof is immersible into the oil in cup 1. The vibrating means 6 is preferably a "Dynatrol," which is commercially available from Automation Products, Incorporated, and which is disclosed in their Bulletin No. J57 entitled, "Dynatrol Level Control-Type CL–10." Essentially the vibrating means 6 consists of a driver end 10 for vibrating the probe and paddle and a pickup end 11 which measures the change in the vibration of the probe. The vibrating means 6 is supported by supporting means 6a for easily immersing the probe 7 into the oil sample.

The "Dynatrol" consists of a coil in the driver end 10 positioned to vibrate the probe 7 which is connected through a vibration linkage path to the pickup end 11. The vibration linkage path includes the paddle 8, which is immersed in the oil. The driver coil receives a 115 volt, 60 cycle per second input and can be adapted to produce a 60 or 120 cycle per second vibration in the linkage path. The linkage path is constructed so as to provide sensitive transmission of vibrational energy through a rigid, all-welded pressure seal. This feature is obtained by welding at the node points where zero amplitude of vibration occurs. The pickup end 11 consists of a permanent magnet stator and a coil which generates a voltage as vibration of the pickup armature occurs. When the paddle 8 is not immersed in the oil sample, the driver armature amplitude of vibration is transmitted through the linkage path to the paddle 8 and on through the linkage path to the pickup armature producing an E.M.F. of approximately 500 millivolts in the pickup end output coil. A damping action, which is proportional to properties of the oil, occurs as the paddle 8 is immersed in the oil to be sensed. This damping action causes a proportional decrease of pickup end armature vibration and coil output.

The electrical signal produced in the output coil can be fed to a variety of electronic controlling, indicating or recording devices. As disclosed in the figure, the electrical signal may be transmitted through electrical lead 12 through a cycle timer 13 to a recorder 14.

When the probe of the vibrating means 6 is immersed in the oil, thermocouple 15 is immersed adjacent the probe for recording the temperature of the oil. A thermocouple 15 is connected by means of electrical lead 16 to the cycle timer 13 wherein the timer will alternately feed the thermocouple signal and output signal of the vibrating means to the recorder 14.

As is schematically shown in the drawing, the recording of the pour point is automatic after the operator has immersed the probe 7 and thermocouple 15 into the oil in cup 1 and inserted the cup into the cooling bath 2. Thereafter, the recorder will alternately record the temperature and the output electrical signal from the vibrating means 6. The graph shown on the recorder is a typical recording wherein the pour point is indicated by the definite break in the output signal obtained from vibrating means. While a signal pen recorder 14 and a cycle timer 13 have been found to give reproducible results, a two pen recorder may be used wherein both the temperature signal and the output signal from the vibrating means 6 are recorded simultaneously for ease of reading the recorder. The pour point temperature is accordingly the temperature of the oil coincident with the definite break in the output signal from the vibrating means 6. Hence on the graph shown, the pour point temperature is the temperature recorded on the temperature curve horizontally opposite the pour point indication break of the vibration curve.

To further illustrate applicants' invention the table below shows a comparison of laboratory minimum fluid points with pour point determinations using a vibrating probe as fully described hereinbefore on several typical lube oil samples. The data include repetitive determinations o nboth the laboratory tests and the vibrating probe determinations which serve to illustrate the reproducibility of each method and accuracy of the vibrating probe method as compared to the laboratory method. The average Δ calculated for the laboratory determination is about 3°, or ±1.5°, and for the vibrating probe method it is about 1°, or ±0.5° for the paraffinic oils. For the naphthenic oils the laboratory Δ is 6°, or ±3°, and the vibrating probe Δ is 2°, or ±1°.

The laboratory minimum fluid points are determined by modifying the pour point determination test (ASTM) by using five samples at 1° F. intervals. Results are reported as the half degree above the temperature at which the stock will not pour.

The rate of cooling as disclosed in the preferred mode and shown in the drawing is between about 2.4° and 2.6° F. per minute when using an air space of not greater than ¼ inch between cup 1 and metal cup 4. The cooling rate may be as slow as one would wish to take for testing the pour point; however, a cooling rate above about 3.5° F. per minute when using a separate probe and thermocouple gives inaccurate results as to pour point temperatures. It is preferable that the cooling rate be within the range of about 2.0 and 2.8° F. per minute.

The design of the probe 7 also has some effect on the reproducibility of meausring pour point. As is set forth heretobefore, the preferred design is a probe having a rectangular paddle 8 attached thereto, the paddle being about ¾ of an inch by 1 inch by ⅛ inch in dimension. Other paddle designs, which may be a part of the probe and which are included within the present invention, are of a generally rectanguler shape but of differing dimensional size. The probe itself may also be a round or rectangular rod, or further, may be of a hairpin configuration. The mounting of the probe may be in a horizontal or vertical plane, or it may be at any desired angle if the oil is in a pipe for example. However, the probe design and the mounting of the probe are chosen such that the vibration of the probe with respect to the oil will result in a pushing effect in the oil rather than a shearing effect.

While the preferred means for vibrating the probe and sensing the changes in vibration of the probe are electrical coils as used in the "Dynatrol," other means to vibrate a probe and sense the change in vibration may be used. For example, a pitch or tuning fork actuated by a mechanical hammer may be used as the vibrating probe. The change in vibration may be sensed by audio means such as a sensitive microphone wherein the frequency change is amplified and recorded. Another example would be the use of an eccentric cam on the shaft of a synchronous motor to vibrate a probe comprising, for example, a reed or paddle, to which is attached a rod connected to a condenser microphone detector. The change in vibration would produce a change in the electrical output of the condenser microphone which would be amplified and recorded. Still another embodiment would

*Table I*

| Sample | Min. Fluid Pt. | Δ | Vibrating Probe Pour Pt. | Δ |
|---|---|---|---|---|
| P1  | 10.5, 13.5, 10.5, 10.5 | 3  | 9, 11, 10, 9        | 2  |
| P2  | 14.5, 15.5             | 1  | 15                  |    |
| P3  | 11.5, 12.5, 10.5, 11.5 | 2  | 10                  |    |
| P4  | 10.5, 10.5, 10.5       | 0  | 7, 10, 9, 11, 11    | 4  |
| P5  | 4.5, 3.5               | 1  | 2, 2, 2, 2          | 0  |
| P6  | 0.5, 0.5, 2.5, −1.5    | 4  | −2, −1, −1, −1      | 1  |
| P7  | 7.5, 7.5, −1.5, −4.5   | 12 | 6, 6, 6, 6          | 0  |
| P8  | 10.5, 11.5             | 1  | 9                   |    |
| P9  | 12.5                   |    | 12                  |    |
| P10 | −0.5                   |    | 0                   |    |
| P11 | 13.5, 15.5             | 2  | 12                  |    |
| P12 | 21.5, 21.5, 20.5       | 1  | 18, 18, 18, 19      | 1  |
| P13 | 0.5, 0.5, −2.5         | 3  | 0                   |    |
| P14 | 11.5, 12.5, 11.5       | 1  | 11                  |    |
| P15 | 12.5                   |    | 12                  |    |
| P16 | 9.5, 9.5, 7.5, 7.5     | 2  | 12, 12, 13          | 1  |
| P17 | −0.5, 5.5, 0.5, 1.5    | 6  | 8, 9, 9             | 1  |
| P18 | 5.5, 2.5, 2.5          | 3  | 8, 8, 8             | 0  |
| P19 | 18.5, 17.5, 19.5       | 2  | 18, 16, 14, 16      | 4  |
| P20 | 9.5, 9.5               | 0  | 6, 8, 8             | 2  |
| P21 | 23.5, 28.5             | 5  | 20, 20              | 0  |
|     | Avg. Δ=3, or ±1.5      |    | Avg. Δ=1, or ±0.5   |    |
| N1  | −5.5, −14.5, −6.5, −6.5 | 9   | −6, −6              | 0 |
| N2  | −5.5, −10              | 4.5 | −19, −19, −19, −17, −21 | 4 |
| N3  | −35                    |    | −31, −33            | 2 |
| N4  | −31.5, −33.5           | 2  | −29                 |    |
| N5  | 14.5, 5.5, 9.5, 11.5   | 9  | 20                  |    |
|     | Avg. Δ=6, or ±3        |    | Avg. Δ=2, or ±1     |    |

It has been found that the rate of cooling, the design of the probe and the relationship between the probe, the thermocouple and the size of the container means for holding the oil all have some effect on the reproducibility for measuring the pour point with the vibrating probe, be to vibrate a probe with an eccentric cam on the shaft of an electric or air motor, attach the rod of a piston to the vibrating probe and record on a pneumatic recorder the pressure fluctuations in the cylinder produced by the piston. Any change in the character of the oil would cause a change in the amplitude of the recorded pressure fluctuations.

It has been found that the frequency of vibration has an effect on the sensitivity of the measurement for pour point. Several tests were run on the same oil using frequencies of 60 and 120 cycles per second. A sharper indication of the frequency change at the pour point was obtained using the higher frequency.

The nature and objects of the present invention having been completely described and illustrated and the best mode thereof set forth, what we wish to claim as new and useful and secure by Letters Patent is:

1. A method of measuring the pour point of oil comprising immersing a vibrating probe into said oil, cooling said oil from a temperature above the pour point of said oil to a temperature below the pour point, and measuring the change of vibrational energy of said vibrating probe with respect to temperature whereby the pour point is determined from a definite break in the vibrational energy cause by a reduction in the damping action of said oil as said oil is cooled.

2. A method of measuring the pour point of oil comprising immersing a vibrating probe into said oil, cooling said oil from a temperature from above the pour point of said oil to a temperature below the pour point, and measuring an electrical signal generated in a response to the vibrational energy of said vibrating probe with respect to temperature whereby the pour point is determined from a definite break in said signal caused by a reduction in the damping action of said oil as said oil is cooled.

3. A method of measuring the pour point temperature of oil comprising immersing a vibrating probe into said oil, cooling said oil from a temperature above the pour point of said oil to a temperature below the pour point, measuring the temperature of said oil as it cools, and measuring the change of vibrational energy of said vibrating probe whereby the pour point temperature is determined by the temperature at which a definite break in the vibrational energy takes place due to a reduction in the damping action of said oil as said oil is cooled.

4. A device for measuring the pour point temperature of oil comprising container means for said oil, cooling means for lowering the temperature of said container means whereby the temperature of said oil in said container is lowered from a temperature above the pour point of said oil to a temperature below the pour point, thermocouple means for measuring the change in temperature of said oil, a probe immersible into said oil, means for vibrating said probe, measuring means for measuring the change in vibrational energy of said vibrating probe, and means for recording said change in temperature of said oil and said change in vibrational energy whereby the pour point temperature is determined from the temperature at which a definite break in the recording of said vibrational energy takes place due to a reduction in the damping action of said oil as said oil is cooled.

5. A device for measuring the pour point temperature of oil as defined in claim 4 wherein said means for vibrating said probe comprises an electrical coil, and said measuring means comprises an electrical coil whereby said vibrational energy of said probe produces a resulting E.M.F. and the pour point temperature is determined from a definite break in the recording of said resulting E.M.F. produced by said vibrational energy of said vibrating probe due to a reduction in the damping effect caused by the change in physical characteristics of said oil as said oil is cooled.

6. A device as defined in claim 5 which further includes a rectangular paddle secured to said probe.

7. A device as defined in claim 6 wherein said rectangular paddle is about ¾ of an inch by 1 inch by ⅛ inch in dimension.

References Cited by the Examiner

UNITED STATES PATENTS

| 2,423,687 | 7/47 | Davis et al. | 73—17 X |
|---|---|---|---|
| 2,973,639 | 3/61 | Banks | 73—54 |
| 3,026,710 | 3/62 | Lupfer | 73—17 |
| 3,100,390 | 8/63 | Banks | 73—32 |

FOREIGN PATENTS 127,518  5/59  Russia.

RICHARD C. QUEISSER, *Primary Examiner.*
DAVID SCHONBERG, *Examiner.*